United States Patent [19]
Meisner et al.

[11] 3,836,213
[45] Sept. 17, 1974

[54] BEARING ASSEMBLY FOR PRECISION MECHANISMS

[75] Inventors: Alfred Meisner, Nurnberg; Walter Spitzl, Heroldsberg, both of Germany

[73] Assignee: Firma Diehl, Nurnberg, Germany

[22] Filed: Apr. 2, 1973

[21] Appl. No.: 346,888

[52] U.S. Cl. ............................................. 308/159
[51] Int. Cl. ............................................ F16c 17/04
[58] Field of Search ........................... 308/159, 158

[56] References Cited
UNITED STATES PATENTS
| | | | |
|---|---|---|---|
| 2,299,519 | 10/1942 | Whitehead | 308/241 |
| 3,535,007 | 10/1970 | Klingler | 308/237 |

FOREIGN PATENTS OR APPLICATIONS
| | | | |
|---|---|---|---|
| 957,044 | 10/1949 | France | 308/159 |
| 1,234,472 | 2/1967 | Germany | 308/159 |
| 541,858 | 1/1932 | Germany | 308/159 |
| 1,458,001 | 9/1966 | France | 308/237 |

*Primary Examiner*—Charles J. Myhre
*Assistant Examiner*—Frank Susko
*Attorney, Agent, or Firm*—Spencer & Kaye

[57] ABSTRACT

A bearing assembly for precision mechanisms, for absorbing the radial and axial forces exerted on a member to be supported, includes a bearing component supporting a radial force absorbing bushing made of a material having good bearing properties, and an axial force absorbing element held in the component and made of aluminum, with the element surface which is to contact the member having been converted into a metallic oxide.

4 Claims, 10 Drawing Figures

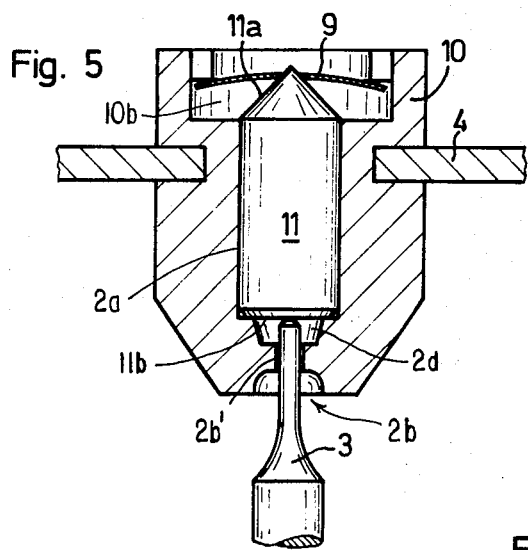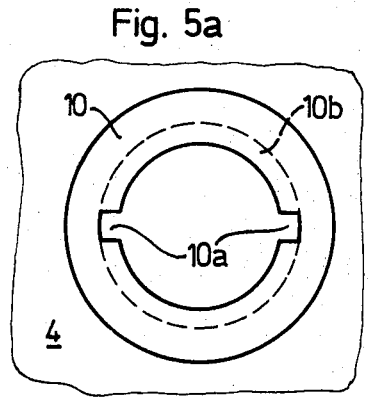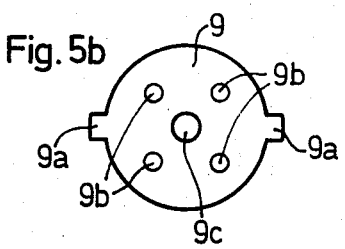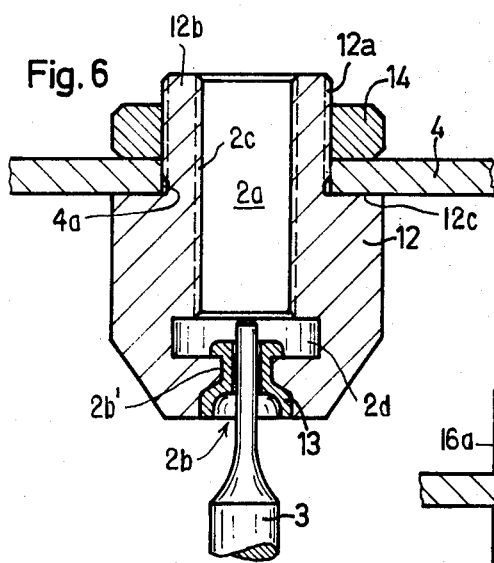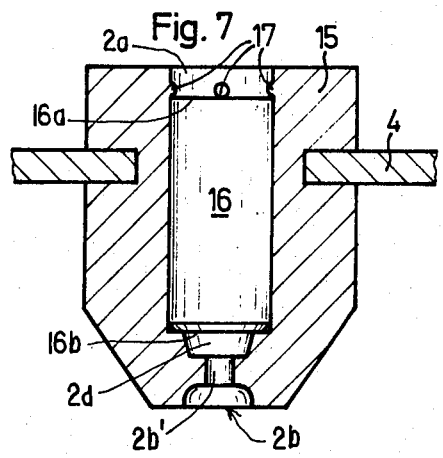

BEARING ASSEMBLY FOR PRECISION MECHANISMS

BACKGROUND OF THE INVENTION

The present invention relates to a bearing assembly for the support of the operating mechanisms in precisely driven instruments and particularly in clocks and watches, which can absorb the radial and axial forces to which the mechanisms may be subjected during normal usage. More particularly, the present invention relates to such assemblies which do not employ conventionally known jewel bearings but rather rely upon materials having the desired qualities for bearings as the bearing element for absorbing the axial forces and as the bearing bushing which is supported within the bearing assembly for absorbing the radial forces.

Bearing assemblies of the type with which this invention is concerned are made in various embodiments. Pivot bearings are used in clocks and watches as well as in measuring instruments which employ analog mechanisms, for example, those utilized in the electrical art for measuring and indicating values. Such pivot bearings are still provided in the form of jewel bearings when there is a demand for a certain level of precision and durability and when use of a tension band bearing is not possible.

Jewel bearings for pivot bearings generally consist of the stones with cavities for a lubricant to support the end of the shafts, i.e., cover stones, the bored-out or ring-like stones which fit over the ends of the shafts to provide radial support and hence function similarly to a bushing and are often referred to as perforated stones and their associated mounts. Jewel bearings are also optionally made or provided with protection against shocks. In structures of the type contemplated by the present invention, stone-bearing screws have previously been used to absorb the axial forces. The axial play or displacement of the shaft can be set or regulated with the aid of such a screw. With such screws, a recess must be drilled out in one end so that a cover stone, e.g., a ruby, can be fitted in or on the screw. The additionally required second or opposite shaft end bearing point is generally so designed that the ruby cover stone is permanently anchored in the support for the bearings in the mechanism.

Jewel bearings such as described above however, do have certain disadvantages which may be considered drawbacks to their continued usage in mechanisms which are designed to provide high quality operation and which are to be available at competitive prices. The costs for the material of the jewels, even the synthetic ones are relatively high. The small and minute-like dimensions of the bearing and its components present many difficulties in assembling and adjusting them. The complicated structures needed to provide shock protection present problems in design and manufacture. Not the least of the disadvantages associated with jewel bearings are the various customs regulations which make the import of instruments with jewel bearings into the United States and certain other countries a very difficult economic problem if the instruments are to be at all competitive in price.

SUMMARY OF THE INVENTION

The present invention provides a bearing assembly which competitively meets the quality demands placed on a jewel bearing but which does not have the disadvantages of such a bearing.

This is accomplished according to the present invention by the provision of a bearing assembly integrally mounted in a support surface and comprising a housing; a bearing bushing which is mounted in the housing and made of a non-jewel-like, non-metallic material having the necessary good properties to function as a bearing to absorb radial forces; and a bearing element to absorb axial forces, this element being mounted in the housing and being made of aluminum, with the surface of this element, at least in the region of the bearing point of the shaft, having been converted to a metallic oxide by means of known processes. Such a process may be, for instance, the anodizing process, which produces an anodized oxide layer on the said region.

Since the bearing element which functions to absorb the axial forces is subjected to the electrochemical treatments only toward the end of the steps in the manufacture of the element, it is possible to shape it practically in any desired manner. The production of a sufficient surface quality at the bearing point is no longer a technical problem. With a wide variety of shapes easily available for the bearing element and for the housing of the bearing assembly, it is easily possible to produce the embodiments of the invention as disclosed herein and illustrated in the drawings. The production costs of the bearing assemblies of this invention are very favorably compared to the costs of production of jewel bearings because the bearing elements of the invention can be treated as mass-produced items during the machining and shaping steps as well as during the processing to anodize the bearing surfaces of the elements.

From a series of experiments and tests it has been discovered that the bearing assemblies of the present invention are equivalent substitutes for, or alternatives to, the previously employed jewel bearings. The cavities required in the jewel bearings for a lubricant must also be provided in the bearing assemblies of the present invention.

It was found that an advantageous material for the bearing-assemblies is a plastic as it is sold for instance under the name Delrin.

BRIEF DESCRIPTION OF THE DRAWINGS

FIG. 5 is a partial cross-sectional view of a further embodiment of the bearing assembly of the present invention with a different type of shock absorbing element.

FIG. 5a is a plan view of the bearing housing shown in FIG. 5, but without the bearing element and the shock absorbing element.

FIG. 5b is a plan view of the configuration of the shock absorbing element shown in FIG. 5.

FIG. 6 is a cross-sectional view of another embodiment of the bearing arrangement with an insertable bearing bushing to absorb radial forces.

FIG. 7 is a cross-sectional view of a further embodiment of a bearing assembly of the present invention with the bearing element slidably pressed into the bearing housing and retained by detents.

DESCRIPTION OF THE PREFERRED EMBODIMENTS

Figure 1:
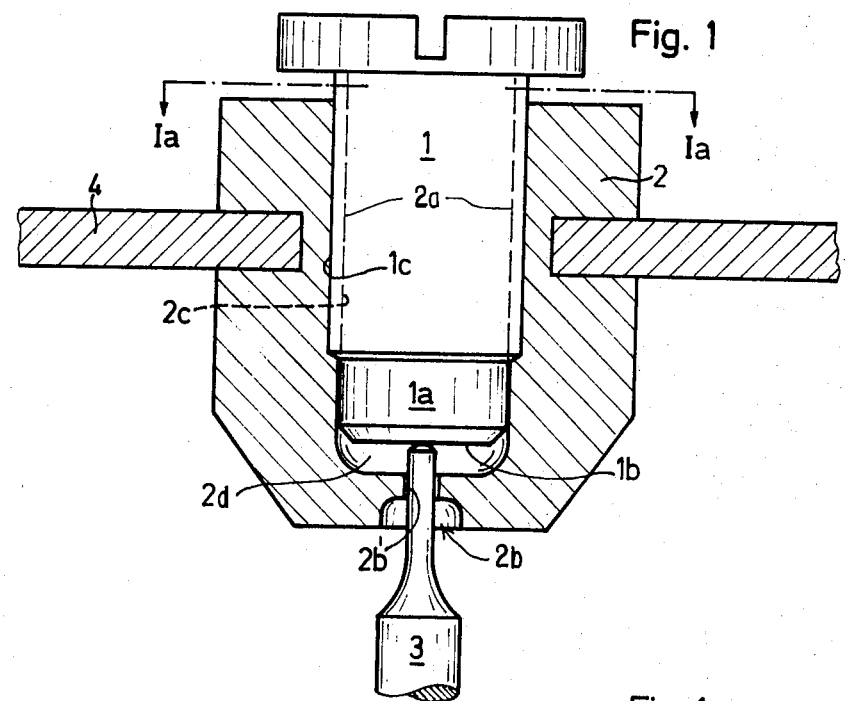
FIG. 1 is a partial cross-sectional view of one embodiment of the bearing assembly according to the present invention wherein the bearing element is inserted into the bearing housing utilizing a self-cutting thread.

In the drawings, the same reference numerals have been utilized for the same elements.

Figure 1A:
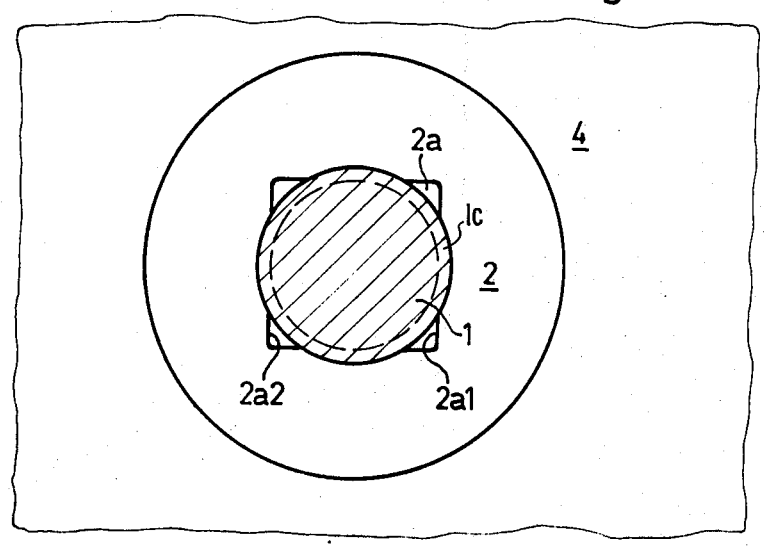
FIG. 1a is a plan view in section of the bearing assembly shown in FIG. 1 along the line Ia — Ia of FIG. 1.

FIGS. 1 and 1a show one embodiment of the bearing assembly of the present invention which includes a bearing element 1 inserted in a bearing housing 2. The bearing housing 2 is cylindrical in cross section and is mounted in a support element 4.

A recess 2a initially having a square cross section is formed in the upper part of housing 2 and a recess 2d is formed in the lower portion of the housing coaxial with and adjoining the lower end of recess 2a. Recess 2d has a cylindrical form. A necked opening 2b leads axially from the bottom surface of the housing into recess 2d. The opening 2b forms a bushing 2b' for a shaft 3 insertable therethrough. Thus, the inner wall faces of elements 2a, 2b, 2b' and 2d define together in the housing 2 a throughgoing passage that has opposite open ends.

Figure 2:
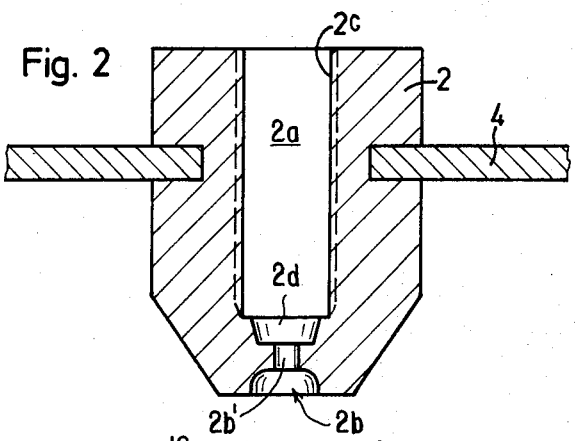
FIG. 2 is a cross-sectional view of a second embodiment of the bearing housing of the present invention with a precut thread in the housing to receive the bearing element.

The bearing housing 2 shown in FIGS. 1 and 2 is made of a plastic material and can thus be attached very economically into a support member, such as a work plate 4, e.g., by being molded in place.

The bearing element 1 is composed of a slotted-head self-topping screw with threads 1c preformed on the upper portion of the screw. The lower portion of the screw comprises a smooth cylindrical section 1a of a diameter equal to the diameter of the root of the threads 1c and of an axial length less than the depth of recess 2d in housing 2 and having a flat undersurface 1b which forms the axial bearing surface for a shaft.

The bearing element 1 in this embodiment is a thread-cutting screw. The axis of cylindrical portion 1a is normal to the terminal bearing surface 1b. The plan view of FIG. 1a shows the square opening 2a in the housing 2. The horizontal distance between two parallel surfaces 2a1 and 2a2 of opening 2a corresponds to the diameter of the cylindrical portion 1a of the screw 1 and is determined by the root diameter of threads 1c. The opening 2b forms the bearing bushing 2b' to radially guide a shaft 3 and communicates with opening 2d. When the bearing element 1 is to be inserted into the housing 2 through one open end thereof the cylindrical portion 1a guides the element 1 into opening 2a until the threads 1c come into contact with the top of the housing 2. The bearing element 1 is then screwed into opening 2a with a downwardly directed, rotating pressure thus cutting threads 2c in the walls of recess 2a. The rotation of the element 1 continues until surface 1b reaches the desired position relative to the bottom of recess 2 b, thus establishing a permanent mount for bearing surface 1b, with surface 1b normal to bushing 2b. The bushing 2b' is thus situated between the outwardly open end of the opening 2b and the terminal bearing surface 1b. For reasons relating to the injection molding art, the solution of forming the threads 2c bearing housing 2 by cutting them during the insertion of the bearing element 1 not only simplifies the task of forming threads 2c but particularly this method also provides a self-locking action from the friction between the metal element 1 and the plastic material of housing 2 against the element 1 backing off from the desired position within housing 2 as a result of the rotation of the shaft 3 against bearing surface 1b.

While the recess 2a is preferably of rectangular cross section, the recess 2a could be circular in cross section. However the force then required for cutting the threads in recess 2a would be unnecessarily increased.

Figure 3:
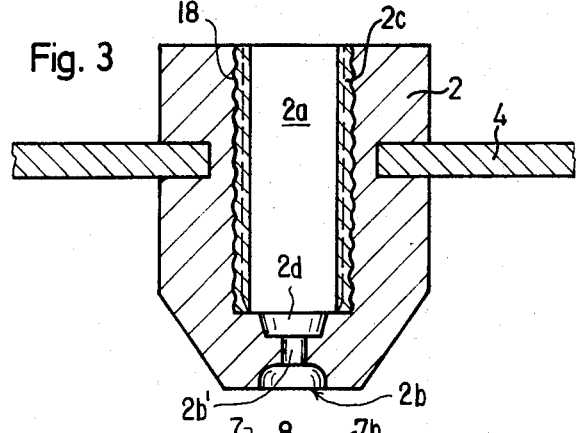
FIG. 3 is a cross-sectional view of a third embodiment of the bearing housing of the present invention with a threaded sleeve securely inserted into the housing to receive the bearing element.

FIGS. 2 and 3 show bearing housings 2 in which the counterthreads 2c for the bearing element 1 are precut. Housing 2 in each of FIGS. 2 and 3 is otherwise substantially the same as the housing 2 shown in FIG. 1. The housings 2 are of suitable plastic material and are integral with support element 4. Each housing contains a recess 2a for the bearing element (not shown) but in these two embodiments recess 2a has a circular cross section. Each housing has a recess 2d in the form of a truncated cone rather than the cylindrical form shown in FIG. 1. Opening 2b in each housing provides for bearing bushing 2b' and also provides for the axial insertion of a shaft as shown in FIG. 1. In FIG. 2 the counterthreads 2c are cut into the bearing assembly 2 itself. In FIG. 3 the counterthreads 2c are cut into a threaded sleeve 18 which is anchored in bearing assembly 2 in any desired manner. This sleeve is made for instance from brass.

To prevent element 1 from backing off from its desired position within recess 2a after its insertion, slight differences can be provided between the pitches of the threads 1c on the element 1 and the counterthread 2c.

Figure 4:
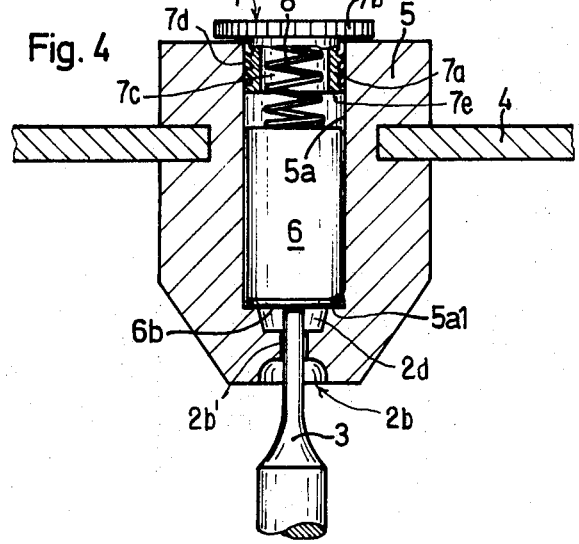
FIG. 4 is a partial cross-sectional view of a further embodiment of the bearing assembly of the present invention with an axial shock absorbing element.

FIG. 4 shows an embodiment of the present invention which includes elements to absorb axial shock. Bearing housing 5, which is preferably molded of plastic material, contains a smooth-surfaced cylindrical recess 5a. A recess 2d, substantially identical to the similar recesses in FIGS. 2 and 3, adjoins the lower end of recess 5a, and opening 2b in the bottom of housing 5 provides the bearing bushing 2b' for radial support of shaft 3. At the juncture of recess 2d and recess 5a, the diameter of recess 2d is less than the diameter of recess 5a thus forming an abutment 5a1 at the bottom of recess 5a. A bearing element in the form of a cylindrical plug 6 is inserted into recess 5a. The plug 6 has a flat surface 6b on the inner end which provides the bearing surface for shaft 3. To prevent pressure against the end of shaft 3, the bearing surface 6b rests on the abutment 5a1 in opening 5a. To hold the bearing plug 6 against the abutment, recess 5a is provided with a closure assembly. The closure assembly comprises a cap 7 having an enlarged head 7b, a depending plug 7a which in turn bears a plurality of resilient rings 7d with an outer diameter slightly greater than that of recess 5a. The plug 7a contains an internal recess 7c to receive a compression spring 8, the upper end of which bears against the bottom of recess 7c the lower end of the spring 8 bearing against the upper surface of plug 6 to resiliently press plug 6 against abutment 5a1. When an axial force or shock is imparted to shaft 3, plug 6 will resiliently yield to the pressure of shaft 3 against bearing surface 6b, but its upward movement will be restrained by abutment 7c on the lower end of plug 7a.

The absorption of axial shocks imparted to a shaft is also achieved with the embodiment of the bearing assembly shown in FIGS. 5, 5a and 5b. The bearing assembly in this embodiment comprises a housing 10 attached to support surface 4 and containing a smooth-surfaced cylindrical recess 2a having an abutment formed on the lower end in the same manner as described for the embodiment in FIG. 4. The recess 2a in FIG. 5 is adjoined at the lower end by opening 2b which forms bearing bushing 2b'. The components of this embodiment are assembled by sliding a plug 11 into recess 2a with cone 11a uppermost. A spring 9 is then inserted into bore 10b by gripping the holes 9b with a suitable tool, e.g., pincers, and inserting the spring into bore 10b above bearing plug 11 in such a way that the cone 11a enters the opening 9c and the tabs 9a pass through the slots 10a into bore 10b so that upon rotation of spring 9 under the shoulder above bore 10b the bearing element 11 is resiliently held against the abutment by spring 9 but is capable of displacement against the spring when the shaft 3 is moved by an axial shock or force.

The embodiment shown in FIG. 6 comprises a cylindrical bearing housing 12 which is made of plastic and contains a recess 2a with counterthreads 2c similar to the like recess in FIG. 2. In this embodiment, an annular recess is formed on the outer upper portion of the housing to provide an annular shoulder 12c. Threads 12a are formed on the vertical wall 12b of the recess. The support surface 4 is placed over the wall 12b into contact with shoulder 12c. The surface 4 and housing 12 are held in this relationship by a nut 14 turned down over threads 12a. The lower portion of the housing contains a recess 2d adjoining recess 2a but of a larger diameter. An opening 2b provides for axial insertion of shaft 3 through bearing bushing 2b 40 which in this embodiment is provided as an insert 13 of a resilient plastic material to absorb radial forces imparted to shaft 3. The bearing element to absorb the axial forces is not shown since it is screwed into thread 2c in the bearing housing 12 in the manner described in FIGS. 2 and 3.

The embodiment shown in FIG. 7 comprises a bearing housing 15 consisting of plastic material which is injection molded into the support surface 4 as previously described. The housing 15 contains a smooth-surfaced recess 2a into which a smooth-surfaced cylindrical plug 16 is inserted as the bearing element. Recess 2d in the form of a truncated cone adjoins the lower end of recess 2a which also forms an annular abutment against which the outer periphery of bearing surface 16b rests. The outer edge of surface 16b is slightly chamfered. Opening 2b provides for axial insertion of shaft through bearing bushing 2b into contact with surface 16b. The upper surface of recess 2a contains a plurality of protruding detents 17 formed of the same plastic material as the housing 15. The components are assembled by inserting plug 16 into recess 2a and pressing the plug downwardly over the detents 17. The detents 17 have sufficient inherent resiliency so that once the chamfered edge of surface 16b passes the detents, they will deform temporarily to allow passage of the remainder of plug 16. Once the end face 16a has passed the detents they will resume their normal configuration and the relatively sharp edge of the surface 16a will not pass over the detents.

It will be understood that the above description of the present invention is susceptible to various modifications, changes and adaptations, and the same are intended to be comprehended within the meaning and range of equivalents of the appended claims.

We claim:

1. A bearing assembly for precision mechanisms for absorbing both radial and axial forces exerted on a member to be supported, comprising in combination:

a. a plastic bearing housing held by a support member and including wall means defining a throughgoing passage having first and second opposite open ends; said wall means further defining a bearing bushing adjacent said first open end and being concentric with respect to said second open end, said bearing bushing being arranged for surrounding the member extending through said first open end to absorb said radial forces; and b. a bearing element made of aluminum and having external threads, said bearing element extending into said passage through said second open end and self-lockingly and threadedly engaging said wall means, said bearing element having a terminal bearing surface oriented towards and spaced from said first open end; said bearing bushing being situated between said first open end and said terminal bearing surface, whereby said terminal bearing surface is arranged for contacting a free end of the member to absorb said axial forces, and the surface of said bearing element, at least in the zone of contact with the member, has been converted into a metallic oxide.

2. A bearing assembly as defined in claim 1, wherein said wall means have a polygonal cross section along a length portion extending from said second open end.

3. A bearing assembly as defined in claim 1 wherein said external threads are thread-cutting threads.

4. A bearing assembly as defined in claim 3, wherein said bearing element includes a first portion carrying said threads and a non-threaded cylindrical second portion terminating in said terminal bearing surface, said second portion has a diameter that equals the root diameter of said first portion.

* * * * *

UNITED STATES PATENT OFFICE
CERTIFICATE OF CORRECTION

Patent No. 3,836,213    Dated September 17th, 1974

Inventor(s) Alfred Meisner et al

It is certified that error appears in the above-identified patent and that said Letters Patent are hereby corrected as shown below:

In the heading of the patent, after line 8, insert:
--Foreign Application Priority Data
Apr. 1, 1972 Germany.......2215915--

Column 3, line 65, change "2 b" to --2b--; line 67, change "2b" to --2b'--.

Column 4, line 3, after "2c" insert --in--.

Column 5, line 38, change "2b40" to --2b'--; line 55, after "of" insert --a--.

Signed and sealed this 24th day of December 1974.

(SEAL)
Attest:

McCOY M. GIBSON JR.
Attesting Officer

C. MARSHALL DANN
Commissioner of Patents